United States Patent
Huang et al.

(10) Patent No.: US 7,477,956 B2
(45) Date of Patent: Jan. 13, 2009

(54) METHODS AND APPARATUS FOR ENHANCING ELECTRONIC DEVICE MANUFACTURING THROUGHPUT

(75) Inventors: Inchen Huang, Fremont, CA (US); Hongbin Ji, San Jose, CA (US); James Hoffman, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 447 days.

(21) Appl. No.: 11/179,812

(22) Filed: Jul. 12, 2005

(65) Prior Publication Data

US 2006/0030966 A1 Feb. 9, 2006

Related U.S. Application Data (60) Provisional application No. 60/587,194, filed on Jul. 12, 2004.

(51) Int. Cl.
*G06F 19/00* (2006.01)
(52) U.S. Cl. ...................................................... 700/100
(58) Field of Classification Search .................. 700/99, 700/100, 121, 159, 173, 174, 175
See application file for complete search history.

(56) References Cited

U.S. PATENT DOCUMENTS

| | | | |
|---|---|---|---|
| 5,148,370 A * | 9/1992 | Litt et al. ..................... 700/104 |
| 6,201,999 B1 * | 3/2001 | Jevtic ......................... 700/100 |
| 6,687,563 B1 * | 2/2004 | Wang et al. ................. 700/121 |
| 6,768,930 B2 * | 7/2004 | Oh ............................. 700/217 |
| 6,941,183 B1 * | 9/2005 | Huang et al. ................ 700/101 |
| 7,130,762 B2 * | 10/2006 | Hellig et al. ................ 702/182 |
| 2002/0152105 A1 * | 10/2002 | Dan et al. ....................... 705/8 |
| 2003/0123958 A1 * | 7/2003 | Sieradzki et al. ............ 414/217 |
| 2003/0139952 A1 * | 7/2003 | Lubash et al. .................. 705/7 |
| 2005/0105991 A1 * | 5/2005 | Hofmeister et al. ......... 414/217 |
| 2005/0283265 A1 * | 12/2005 | Denton et al. ............... 700/103 |

* cited by examiner

*Primary Examiner*—Albert DeCady
*Assistant Examiner*—Chad Rapp
(74) *Attorney, Agent, or Firm*—Dugan & Dugan PC (57) ABSTRACT

In some aspects, a method is provided for enhancing electronic device manufacturing throughput within an electronic device manufacturing tool. The method includes the steps of (1) for the electronic device manufacturing tool, creating an electronic device manufacturing schedule based on process factors and mechanical factors associated with the manufacturing tool; and (2) employing the electronic device manufacturing schedule during electronic device manufacturing within the electronic device manufacturing tool. Numerous other aspects are provided.

25 Claims, 4 Drawing Sheets

METHODS AND APPARATUS FOR ENHANCING ELECTRONIC DEVICE MANUFACTURING THROUGHPUT

The present application claims priority from U.S. Provisional Patent Application Ser. No. 60/587,194, filed Jul. 12, 2004, which is hereby incorporated by reference herein in its entirety.

FIELD OF THE INVENTION

The present invention relates generally to electronic device manufacturing, and more particularly to methods and apparatus for enhancing electronic device manufacturing throughput.

BACKGROUND

An event driven algorithm may be employed to control processing of substrates in an electronic device manufacturing facility during electronic device manufacturing. Such event driven algorithms may determine a processing tool is available, determine one or more substrates need to be transported to the processing tool, and transport the one or more substrates to the processing tool. However, such an algorithm may not efficiently route traffic (e.g., the substrates) through or within processing tools during electronic device manufacturing. For example, inefficiencies, such as dead locks and/or bottlenecks (e.g., jams), which adversely affect throughput, may occur during manufacturing. Thus, methods and apparatus are desired for enhancing electronic device manufacturing throughput.

SUMMARY OF THE INVENTION

In certain aspects of the invention, a first method is provided for enhancing electronic device manufacturing throughput within an electronic device manufacturing tool. The first method includes creating a manufacturing schedule for an electronic device manufacturing tool based on process factors and mechanical factors associated with the manufacturing tool; and employing the manufacturing schedule during electronic device manufacturing within the tool.

In certain aspects of the invention, a second method is provided for enhancing electronic device manufacturing throughput within an electronic device manufacturing tool. The second method includes determining a required manufacturing throughput for the tool; determining at least one mechanical factor of the tool; determining at least one process factor for an auxiliary chamber in the tool; and calculating a process time and/or a process maintenance time for a processing chamber in the tool based on the at least one mechanical factor of the tool and the at least one process factor for the auxiliary chamber such that the required manufacturing throughput is met.

In certain aspects of the invention, a third method is provided for enhancing electronic device manufacturing throughput within an electronic device manufacturing tool. The third method includes determining a required manufacturing throughput for the tool; determining a process time and/or a process maintenance time for a processing chamber in the tool; and calculating a mechanical factor of the tool based on the process time and/or the process maintenance time of the processing chamber in the tool such that the required manufacturing throughput is met. Numerous other aspects are provided, as are methods, systems, apparatus and computer program products in accordance with these other aspects of the invention. Each computer program product described herein may be carried by a medium readable by a computer (e.g., a carrier wave signal, a floppy disc, a compact disc, a DVD, a hard drive, a random access memory, etc.).

Other features and aspects of the present invention will become more fully apparent from the following detailed description, the appended claims and the accompanying drawings.

DETAILED DESCRIPTION

The present invention facilitates enhancing electronic device manufacturing throughput within an electronic device manufacturing tool. The present methods and apparatus create and employ an electronic device manufacturing schedule for using components of a tool that enhances throughput of the tool by optimizing the relative timing of the use of the individual tool components. Further, the present methods and apparatus enhance electronic device manufacturing throughput by allowing a user to design an electronic device manufacturing tool for a specified electronic device manufacturing process or design an electronic device manufacturing process for a specified electronic device manufacturing tool.

Figure 1:
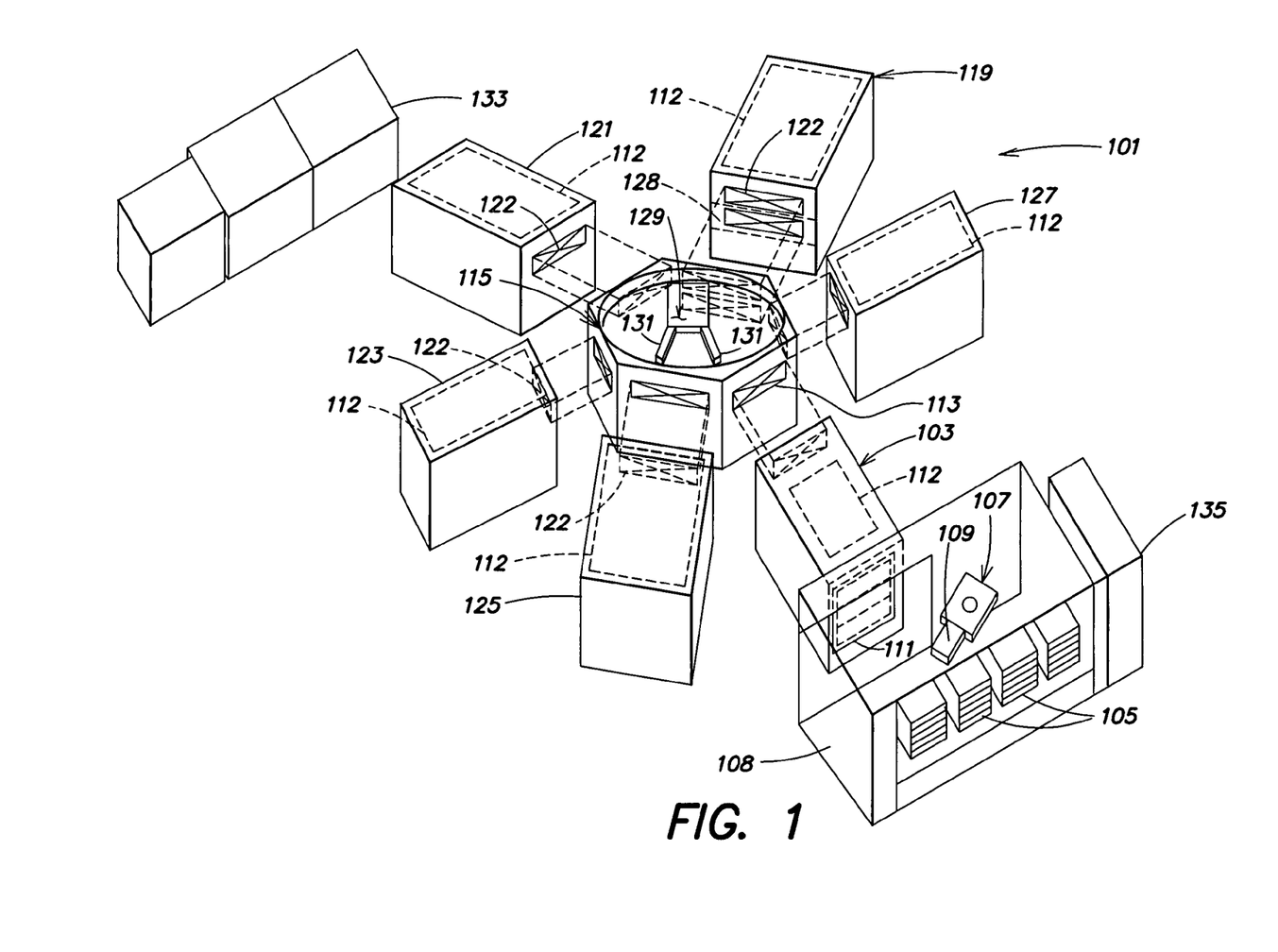
FIG. 1 is a schematic representation of an exemplary electronic device manufacturing tool for enhancing manufacturing throughput in accordance with some embodiments of the present invention.

FIG. 1 is an exploded representation of an exemplary electronic device manufacturing tool for enhancing manufacturing throughput in accordance with some embodiments of the present invention. With reference to FIG. 1, an exemplary electronic device manufacturing tool 101 may include one or more load locks 103 (only one shown) coupled to one or more substrate cassettes 105 via an atmospheric (ATM) robot 107, which may be included in a factory interface chamber 108. Each load lock 103 may include one or more slots for inputting and/or outputting a substrate (e.g., a glass substrate, a semiconductor wafer, etc.).

The ATM robot 107, which may include one or more ATM robot arms 109 (only one shown), is operable to transport a substrate between the load lock 103 and the one or more substrate cassettes 105. For example, the ATM robot 107 may transport a substrate from a substrate cassette 105 and insert the substrate into the load lock 103. More specifically, each load lock 103 includes an input/output (I/O) door 111 through which the ATM robot 107 may insert a substrate. Further, each load lock 103 may include an elevator 112 (e.g., a load lock elevator) for raising and/or lowering substrates in the load lock 103. In some embodiments, the load lock 103 used may be a triple single-slot load lock (TSSL). However, different load lock configurations may be employed.

The load lock 103 may be coupled to a transfer chamber 115 via a load lock slit valve 113. The dashed lines between the load lock slit valve 113 and the transfer chamber 115 indicate how components line up when the tool is re-assembled. The dashed lines representing the elevator 112 indicate that the elevator 112 is within the load lock 103 and would not normally be visible.

The transfer chamber 115 may be similarly coupled to one or more processing chambers 119, 121, 123, 125, 127, each of which may include one or more processing chamber storage locations (e.g., slots) 128 for inputting and/or outputting a substrate to/from the processing chamber and/or for storing a substrate within the processing chamber. More specifically, each of the processing chambers 119, 121, 123, 125, 127 may include at least one respective processing chamber slit valve 122 (e.g., a processing chamber slit valve 122 corresponding to each processing chamber storage location (e.g., slot 128) of the processing chamber). Similar to the load lock 103, each processing chamber 119, 121, 123, 125, 127 may include an elevator 112 (e.g., processing chamber elevator) for raising and/or lowering a substrate in the processing chamber 119, 121, 123, 125, 127. In some embodiments, the transfer chamber 115 may be coupled to five processing chambers 119, 121, 123, 125, 127. However, the transfer chamber 115 may be coupled to a larger or smaller number of processing chambers. The one or more processing chambers 119, 121, 123, 125, 127 may include a chemical vapor deposition (CVD) chamber, a physical vapor deposition (PVD) chamber or any other suitable processing chamber. Further, the transfer chamber 115 also may be coupled to an auxiliary chamber (e.g., in addition to the load lock chamber 103). An auxiliary chamber may include a load lock chamber, a transfer chamber, a factory interface chamber or other similar service chamber, a heating chamber, a cooling chamber, etc.

The transfer chamber 115 includes a robot (e.g., a vacuum robot 129), which may include one or more vacuum robot arms 131, for moving a substrate among the one or more processing chambers 119, 121, 123, 125, 127 and the one or more load locks 103 during electronic device manufacturing. For example, the vacuum robot 129 may insert a substrate into a processing chamber 119, 121, 123, 125, 127 through the processing chamber slit valve 122. The elevator 112 of the processing chamber 119, 121, 123, 125, 127 may then raise and/or lower to remove the substrate from the vacuum robot 129.

The exemplary electronic device manufacturing tool 101 may include one or more pump modules 133 (e.g., a respective pump module coupled to the load locks 103, the transfer chamber 115 and processing chambers 119, 121, 123, 125, 127). The one or more pump modules 133 create a desired (e.g., vacuum) pressure in the load locks 103, transfer chamber 115 and/or processing chambers 119, 121, 123, 125, 127 during electronic device manufacturing. In some embodiments, the components of the electronic device manufacturing tool other than the processing chambers 119, 121, 123, 125, 127 are referred to as the "mainframe" (although, in some embodiments, the mainframe includes the processing chambers 119, 121, 123, 125, 127).

An exemplary electronic device manufacturing tool 101 may include a control system 135, coupled to the mainframe and processing chambers 119, 121, 123, 125, 127, for controlling operation of the system 101 during electronic device manufacturing. For example, the control system 135 may include one or more microprocessors, microcontrollers and/or computer program products (e.g., in one or more computers) adapted to execute code for enhancing throughput of the tool 101 during electronic device manufacturing in accordance with some embodiments of the present invention. In some embodiments, the control system 135 may include a processing chamber control computer (not shown) corresponding to each processing chamber 119, 121, 123, 125, 127 for controlling operation of the processing chamber 119, 121, 123, 125, 127 and an associated pump module 133.

Further, the control system 135 may include a mainframe control computer (not shown) for controlling operation of one or more of substrate cassettes 105, the one or more load locks 103, the ATM robot 107, the transfer chamber 115 and any associated pump module 133, the vacuum robot 129, and/or any heating chamber (not shown). Further, the control system 135 may include an operator control computer (e.g., workstation) (not shown) for communicating with and/or controlling the processing chamber control computers and the mainframe control computer. Each of the processing chamber control computers, the mainframe control computer and the operator control computer may be adapted to execute code for enhancing electronic device manufacturing throughput within the electronic device manufacturing tool 101 in accordance with some embodiments of the present invention. For example, the control system 135 may create an optimized electronic device manufacturing schedule for the electronic device manufacturing tool 101 to employ during electronic device manufacturing. A user may print, check, alter, and/or monitor the schedule via the control system 135. Instead of merely being event-driven and waiting for each task to complete before starting a subsequent task, the control system 135 may enhance the throughput of the electronic device manufacturing tool 101 by anticipating the completion of tasks and initiating subsequent tasks early, especially those tasks that may have a significant startup delay (as described below). In this manner, the schedule may be used to maximize and optimize the simultaneous use of the components of the tool 101.

Figure 2:
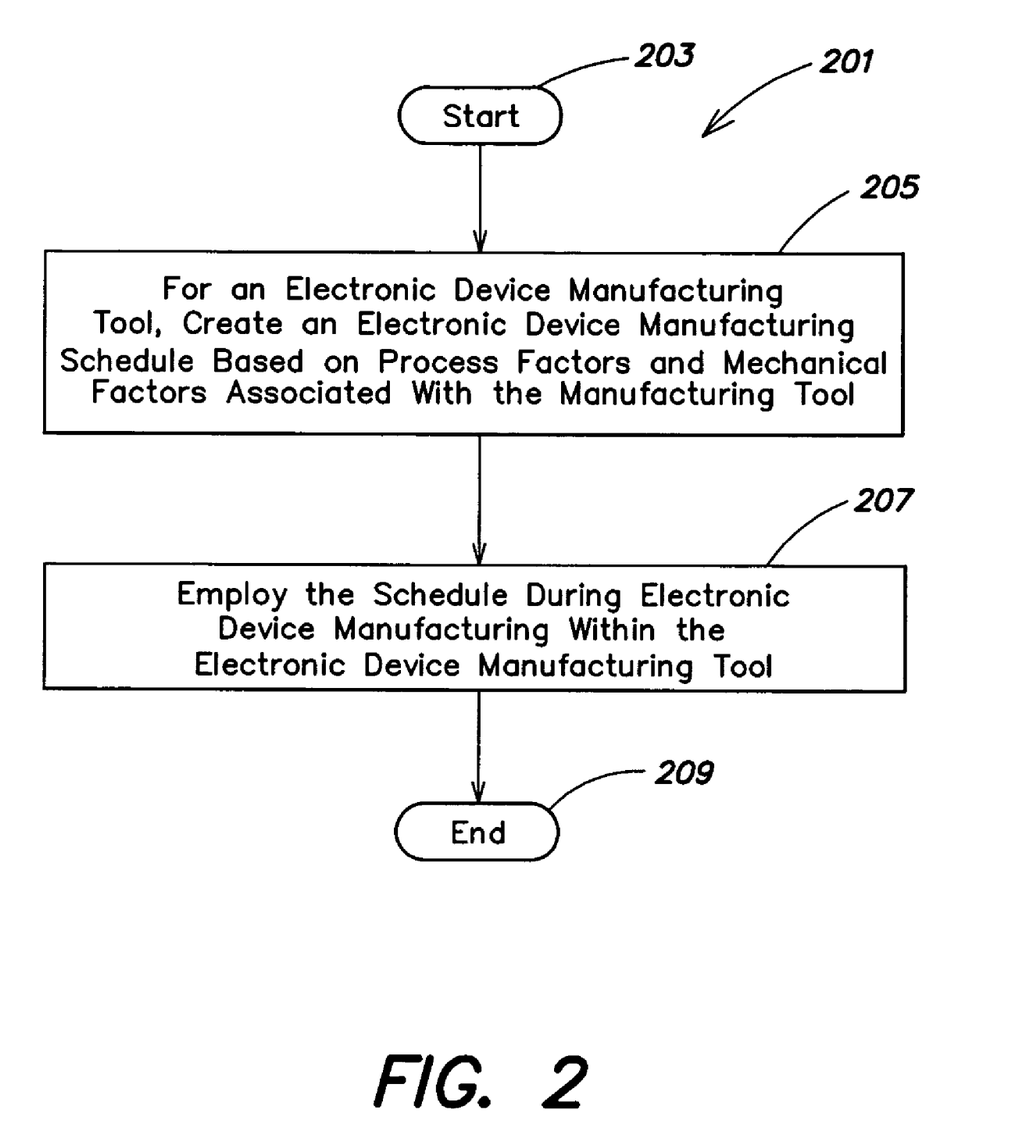
FIG. 2 illustrates a first exemplary method of enhancing electronic device manufacturing throughput within an electronic device manufacturing tool in accordance with some embodiments of the present invention.

The operation of the exemplary electronic device manufacturing tool 101 is now described with reference to FIGS. 1 and 2. FIG. 2 illustrates an exemplary method of enhancing electronic device manufacturing throughput within an electronic device manufacturing tool 101 in accordance with some embodiments of the present invention.

With reference to FIG. 2, in step 203, the method 201 begins. In step 205, an electronic device manufacturing schedule is created for the electronic device manufacturing tool 101 based on processing factors and mechanical factors associated with the manufacturing tool. An exemplary electronic device manufacturing schedule provided in accordance with the present invention is described below with reference to FIG. 3.

The electronic device manufacturing schedule promotes an efficient flow of traffic (e.g., of one or more substrates) through the electronic device manufacturing tool 101 during electronic device manufacturing. More specifically, the electronic device manufacturing schedule efficiently employs the various components of the electronic device manufacturing tool 101 such that the electronic device manufacturing throughput is enhanced (e.g. increased) compared to conventional electronic device manufacturing tools. For example, the electronic device manufacturing schedule may specify when a substrate should be transferred to and/or from a processing chamber 119, 121, 123, 125, 127, when a substrate process should start and/or the duration of the process for each substrate received by the electronic device manufacturing tool 101. In this manner, the created schedule oversees the overall traffic flow in the electronic device manufacturing tool 101 during electronic device manufacturing.

The control system 135 is adapted to create (e.g., calculate) the electronic device manufacturing schedule based on at least one electronic device manufacturing factor. Manufacturing factors include mechanical factors and process factors. Mechanical factors generally include physical limitations of hardware devices and parameters that are not alterable or intended to be controllable by an operator or customer using the tool 101. In other words, mechanical factors are generally determined by the tool manufacturer and relate to the capabilities and/or status of the tool 101.

In contrast, process factors are generally determined by users of the tool 101 and generally relate to the different possible ways the tool 101 may be used to perform various processes or to achieve a desired end result. Note however that some process factors may be limited by and/or include mechanical factors. For example, consider a CVD process that always requires at least a minimum amount of startup time to execute before any material is deposited. Thus, whether the operator wants to perform a process that involves depositing a thin layer or a thick layer of material, the process will always be subject to the "mechanical" startup time factor. Also note that in some circumstances an operator may affect a mechanical factor by, for example, disabling a tool component or taking a process chamber offline. Collectively, electronic device manufacturing factors may include, for example:

(a) a number of different sequences to be performed for a substrate and the contents for each sequence to be performed for the substrate (e.g., the number of steps in a sequence, the number of chambers to be used in a sequence, etc.);

(b) a number of available (e.g., online) chambers in the electronic device manufacturing tool 101 and a number of slots included in such available chambers; and (c) a duration of each chamber operation (e.g. a CVD process time, a pre-heat time, a periodic maintenance (pm) cycle and pm cleaning recipe time, pumping/venting time of loadlocks, and/or transfer times of, for example, the vacuum robot 129, the ATM robot 107, the elevator 112, the slit valves 113, 117, 122, the I/O door 111, etc.).

For example, for each substrate that will enter the electronic device manufacturing tool 101, a user (e.g., a customer) may specify the number of different sequences to be performed on the substrate and the contents of the sequences, thereby indicating how the substrate will be processed by the electronic device manufacturing tool 101. The customer may specify to which chamber 119, 121, 123, 125, 127 the substrate is to be transferred, what process the chamber 119, 121, 123, 125, 127 is to perform, a specific recipe (e.g., processing recipe) to be employed by the chamber 119, 121, 123, 125, 127 and a number of times the process is to be performed by the chamber 119, 121, 123, 125, 127. Such information may be considered process factors and may be provided to the electronic device manufacturing tool 101 by an operator via the operator control computer 135, for example.

The control system 135 may also consider the number of available chambers in the electronic device manufacturing tool 101 and the number of slots (e.g., or other storage locations) included in such available chambers to create the electronic device manufacturing schedule. A chamber is available if the chamber is online. However, a chamber may not be online (e.g., is offline) if a chamber fault occurred during electronic device manufacturing, if the chamber is offline for maintenance, or if the customer decides not to employ the chamber during electronic device manufacturing. Such information may be considered mechanical factors. The control system 135 may consider the number of slots included in the available chambers because the number of slots may affect the traffic flow in the electronic device manufacturing tool 101. For example, during electronic device manufacturing, the transfer chamber 115 may employ an unused storage location (e.g., slot) of an available chamber to temporarily store a first substrate so that the transfer chamber may transfer other substrates before the first substrate. In this manner, the storage location (e.g., slot) may serve as a substrate buffer during electronic device manufacturing.

Further, the control system 135 may consider the duration of each chamber operation and/or the speed at which each chamber operation is performed to create the electronic device manufacturing tool schedule. Duration of chamber operations includes a process time, pre-heat time, periodic maintenance (pm) cycle and pm cleaning recipe time, time required for pumping each load lock, time required for venting each load lock, vacuum robot transfer time and ATM robot transfer time. The duration of different and/or additional chamber operations may be considered. Such information may be considered manufacturing factors. For example, the control system 135 may consider the duration of a post-heating (e.g., annealing) process to create the electronic device manufacturing schedule.

The process time, pre-heat time, periodic maintenance (pm) cycle and pm cleaning recipe time, etc. may be considered process factors and the time required for pumping each load lock, time required for venting each load lock, vacuum robot transfer time and ATM robot transfer time, etc. may be considered mechanical factors.

Process time is the time required to perform a process (e.g., CVD, PECVD or the like) on a substrate in a chamber. The pre-heat time is the time required before processing to heat a substrate to a suitable temperature for processing. The pm cycle indicates the number of substrates that may be processed by a chamber before the chamber is cleaned. The pm cleaning recipe time indicates how long the periodic maintenance (e.g., cleaning) will take. The periodic maintenance may include coating chamber components after cleaning (e.g., seasoning). Note that these factors are generally under the control of the operator.

After a substrate is inserted into a load lock 103, the pressure in the load lock 103 may be adjusted before the substrate is transferred to another component of the electronic device manufacturing tool 101. A pump module 133 corresponding to the one or more load locks 103 and/or a respective exhaust pipe (not shown) coupled to each of the load locks 103 are employed to create the required pressure in the load lock 103. The time required to create the required pressure in the load lock 103 is based on the volume of the load lock 103, the power of the pump module 133 and the volume of the exhaust pipe.

The vacuum robot transfer time refers to the time required by the vacuum robot 129 to transfer a substrate between a load lock 103 and a processing chamber 119, 121, 123, 125, 127 or between a first and second processing chamber 121, 123, 125, 127. The vacuum robot transfer time includes a time required by a chamber elevator 112 (e.g., a load lock elevator and/or processing chamber elevator) to raise or lower the substrate to or from the vacuum robot 129. Further, the vacuum robot transfer time includes a time to open and/or close one or more slit valves (e.g., one or more load lock slit valves 113 and/or one or more processing chamber slit valves 122). In this manner, the vacuum robot transfer time is, in part, based on elevator and slit valve speed.

The ATM robot transfer time refers to the time required by the ATM robot 107 to transfer a substrate between a load lock 103 and a substrate cassette 105, for example. The ATM robot transfer time includes the time required by the elevator 112 (e.g., load lock elevator) to raise and/or lower the substrate.

Further, the ATM robot transfer time includes a time required to open and/or close an I/O door 111 of the load lock 103 to or from which the substrate is transferred.

Thus, based on the process factors and mechanical factors (i.e., electronic device manufacturing factors) associated with the manufacturing tool 101, the control system 135 creates a schedule for the electronic device manufacturing tool 101 that enhances electronic device manufacturing throughput during electronic device manufacturing.

In step 207, the electronic device manufacturing schedule is employed within the tool 101 during electronic device manufacturing. More specifically, the control system 135 employs the electronic device manufacturing schedule during electronic device manufacturing to provide an efficient flow of traffic (e.g., of one or more substrates) through the exemplary tool 101 by efficiently employing the various components of the electronic device manufacturing tool 101. Thereafter, step 209 is performed.

In step 209, the method 201 ends. Through use of the method 201 of FIG. 2, the electronic device manufacturing tool 101 may employ the electronic device manufacturing schedule to reduce an overall substrate wait time. Consequently, the electronic device manufacturing throughput of the electronic device manufacturing tool 101 is enhanced.

While describing the example method 201 of FIG. 2, it was assumed the process factors and mechanical factors (e.g., electronic device manufacturing factors), described above, remained static during electronic device manufacturing. However, process and mechanical factors may change during electronic device manufacturing. Therefore, the method 201 of FIG. 2 may additionally include detecting a change in the process factors and/or mechanical factors (e.g., a change in at least one of the process and mechanical factors) and dynamically creating a new schedule that factors in the detected change. In some embodiments, the new schedule may be implemented without having to stop processing to reconfigure the control system 135 or the tool 101. For example, the control system 135 may detect a change in the number of available chambers because a fault in a chamber during electronic device manufacturing causes the chamber to go offline. Alternatively, the control system 135 may detect the duration of one or more chamber operations exceeding the value used to create the first electronic device manufacturing schedule. For example, an actual process time or an actual robot transfer time during electronic device manufacturing may exceed corresponding values employed to create the first electronic device manufacturing schedule.

More specifically, when a change in the process factors and/or mechanical factors associated with the tool 101 is detected during electronic device manufacturing according to the schedule, subsequent operations included in the schedule, and thus tool throughput, may benefit from adjustments to the schedule due to the change in the manufacturing factors relied upon to create the original schedule. Consequently, the method 201 of FIG. 2, additionally, may create a modified schedule based on the changed process factors and mechanical factors.

The control system 135 creates the modified schedule in a manner similar to that employed to create the previous (e.g., original) schedule. However, while calculating the modified electronic device manufacturing schedule, the control system 135 substitutes the value of the changed process factors and/or mechanical factors for the corresponding value(s) employed to create the previous electronic device manufacturing schedule.

Once the control system 135 creates the modified electronic device manufacturing schedule, the tool 101 may employ the modified electronic device manufacturing schedule during electronic device manufacturing to enhance electronic device manufacturing throughput.

The control system 135 may dynamically and automatically create and/or employ the modified schedule in response to a change in the process factors and mechanical factors (e.g., at least one of the process and mechanical factors). In this manner, the electronic device manufacturing tool 101 may adjust a schedule employed within the tool 101 during operation such that the tool 101 employs a schedule that enhances throughput throughout electronic device manufacturing and without the need to stop processing to reconfigure the tool 101 or control system 135. Therefore, the tool 101 may calculate and/or generate a new electronic device manufacturing schedule as needed.

Figure 3:
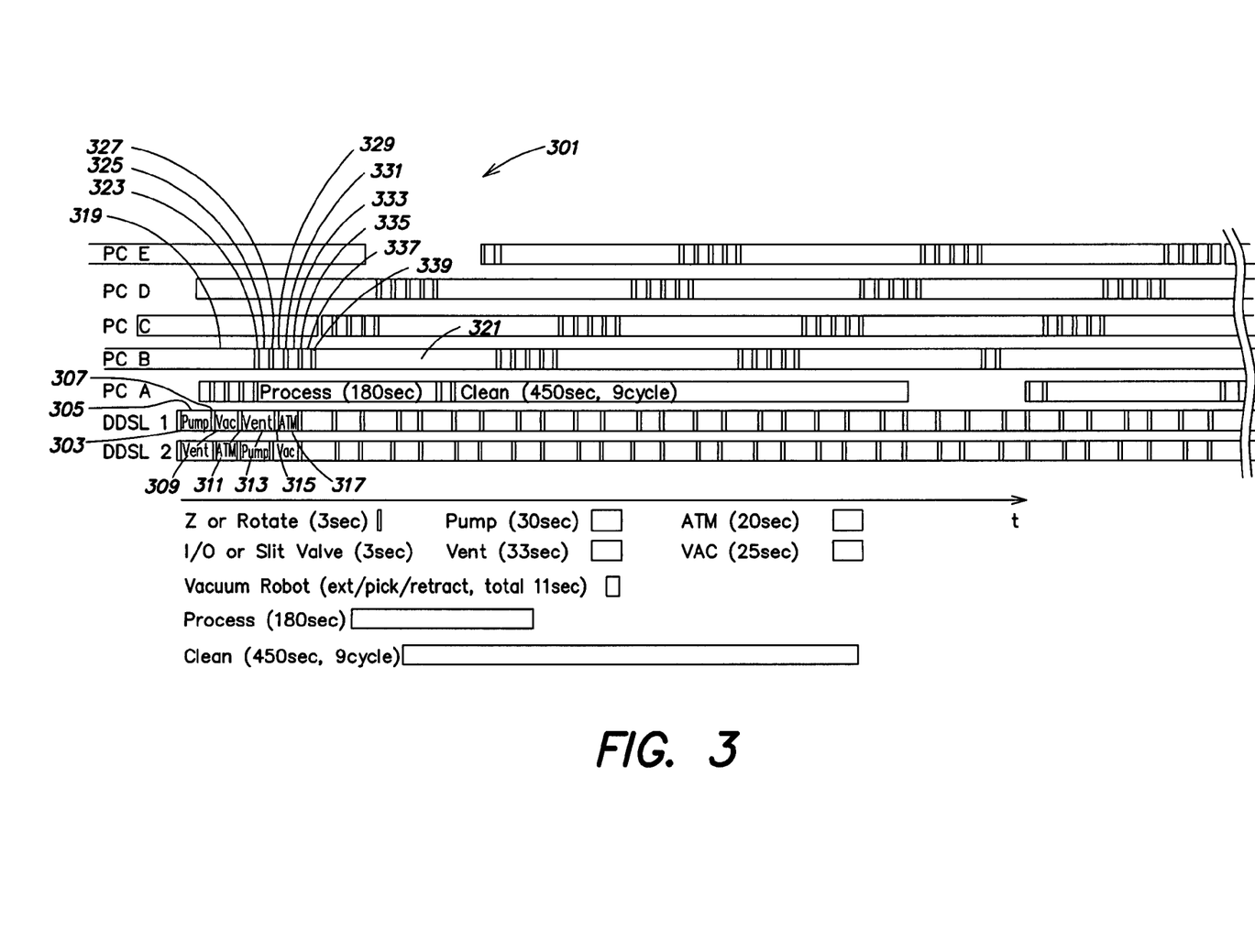
FIG. 3 illustrates an electronic device manufacturing schedule in accordance with some embodiments of the present invention.

FIG. 3 illustrates an example electronic device manufacturing schedule 301 in accordance with some embodiments of the present invention. With reference to FIG. 3, the example schedule 301 is for an electronic device manufacturing tool 101 that includes two load locks (e.g., double dual-slot load locks (DDSL)) DDSL 1, DDSL 2 and five processing chambers PC A-PC E. The schedule 301 indicates the operations performed by each of the load locks DDSL 1, DDSL 2 and the processing chambers PC A-PC E over time t. In the example, the load locks DDSL 1, DDSL 2 each perform the same sequence of operations. For example, an I/O door of a load lock will be actuated (e.g., closed) as shown at reference numeral 303, which is allotted three seconds. Then, the load lock is pumped to a desired pressure as shown at reference numeral 305, which is allotted thirty seconds. Thereafter, the slit valve of the load lock is actuated (e.g., opened) as shown at reference numeral 307, which is allotted three seconds. Then, a vacuum robot 129 is moved as shown at reference numeral 309, which is allotted twenty-five seconds. Thereafter, the slit valve of the load lock is actuated (e.g., closed) as shown at reference numeral 311, which is allotted three seconds. Then, the load lock is vented (e.g., via an exhaust pipe) as shown at reference numeral 313 to create a desired pressure in the load lock, which is allotted thirty-three seconds. Thereafter, an I/O door of the load lock is actuated (e.g., opened) as shown at reference numeral 315, which is allotted three seconds, and an ATM robot 107 is moved as shown at reference numeral 317, which is allotted twenty seconds. Although load lock DDSL 1 and DDSL 2 perform the same sequence of operations, the sequence of operations are staggered such that while one of the load locks DDSL 1, DDSL 2 is pumped to a desired pressure, the other load lock DDSL 2, DDSL 1 is vented to a desired pressure. This staggering of operation sequences is determined as part of determining the schedule and helps to optimize throughput by using components of the tool 101 (e.g. the pump module 133) most efficiently and at the optimal time. Thus, for example, pumping of one load lock is not unexpectedly delayed by unavailability of the pump module 133 due the pump module 133 being used with the other load lock.

Further, each of the processing chambers PC A-PC E performs the same sequence of operations in this example. For example, each of the processing chambers PC A-PC E may process nine substrates before the processing chamber is cleaned. One hundred eighty seconds is allotted for the process time and four hundred fifty seconds is allotted for the process maintenance (e.g., clean). Further, between the processing of a first substrate as shown at reference numeral 319 and second substrate (or set of substrates) as shown at reference numeral 321 in a processing chamber PC A-PC E, a processing chamber slit valve may be actuated (e.g., opened) as shown at reference numeral 323, which is allotted three seconds. Then, a vacuum robot extends into, picks up a substrate from, and retracts from the processing chamber PC A-PC E as shown at reference numeral 325, which is allotted eleven seconds. Thereafter, the vacuum robot may rotate as shown at reference numeral 327, which is allotted three seconds. Then, the vacuum robot 129 (1) may extend into, drop off the processed substrate for, and retract from a load lock as shown at reference numeral 329, which is allotted eleven seconds; (2) may move along a z-axis (e.g., vertically) as shown at reference numeral 331, which is allotted three seconds; and (3) extends into, picks up a new substrate, and retracts from the load lock as shown at reference numeral 333, which is allotted eleven seconds. The latter movements correspond to the vacuum robot 129 movement during the operation sequence of one of the load locks DDSL 1, DDSL 2. Thereafter, the vacuum robot 129 may rotate as shown at reference numeral 335, which is allotted three seconds, and the vacuum robot may extend into, drop the new substrate for, and extend from the processing chamber PC A-PC E as shown at reference numeral 337, which is allotted eleven seconds. Then, the processing chamber slit valve may be actuated (e.g., closed) as shown at reference numeral 339, which is allotted three seconds.

Although each of the processing chambers PC A-PC E performs the same sequence of operations in this example, the sequence of operations are staggered such that while one substrate (or set of substrates) is removed from a processing chamber PC A-PC E, one of the load locks DDSL 1, DDSL 2 has been pumped to a desired pressure such that the load lock DDSL 1, DDSL 2 may receive the substrate. In this manner, the overall wait time for the electronic device manufacturing tool is reduced, and therefore, the electronic device manufacturing throughput is enhanced.

Note that the values for all process factors and mechanical factors (e.g., electronic device manufacturing factors) described above with reference to FIG. 3 are exemplary. Different values may be employed for any of the above-described process factors and mechanical factors. For example, different required times may be employed for any of the above-described operations. Further, although in the example schedule presented in FIG. 3 each of the processing chambers PC A-PC E performs the same sequence of operations, the present methods and apparatus may be employed to create a schedule for an electronic device manufacturing tool 101 in which two or more processing chambers perform different sequences of operations.

Figure 4:
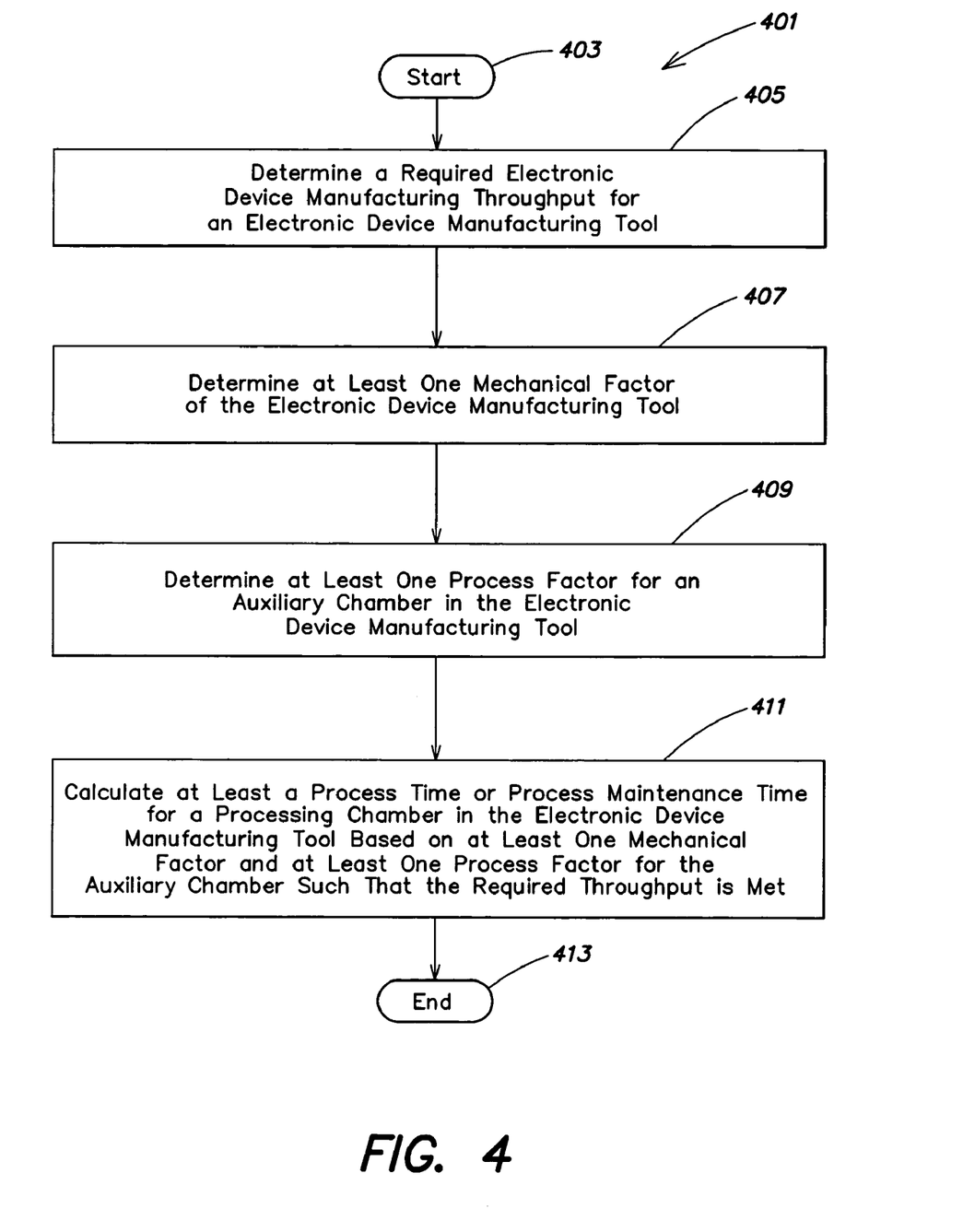
FIG. 4 illustrates a second exemplary method of enhancing electronic device manufacturing throughput within an electronic device manufacturing tool in accordance with some embodiments of the present invention.

As described above, the present methods and apparatus enhance throughput during electronic device manufacturing by employing and/or adjusting an electronic device manufacturing schedule. Alternatively or additionally, a user may enhance throughput during electronic device manufacturing by employing the present methods and apparatus to design a tool with an enhanced electronic device manufacturing throughput. FIG. 4 illustrates an additional exemplary method of enhancing electronic device manufacturing throughput within an electronic device manufacturing tool in accordance with some embodiments of the present invention. With reference to FIG. 4, in step 403, the method 401 begins. In step 405, a required or desired manufacturing throughput for an electronic device manufacturing tool 101 is determined. For example, a user may determine a required electronic device manufacturing throughput for the tool 101, and input the required throughput into the control system 135 (e.g., via the operator control computer), which may include one or more microprocessors, microcontrollers and/or computer program products.

In step 407, at least one mechanical factor of the tool is determined. For example, the control system 135 determines the configuration of the tool 101, and determines mechanical factors (e.g., limitations) of the electronic device manufacturing tool. More specifically, the control system 135 may determine the number of load locks 103 included in the tool 101. Because the load locks 103 may share the same pump module 133, only one of the load locks 103 may be pumped at a time (e.g., the load locks 103 are alternately pumped). Similarly, because the load locks 103 may share the same exhaust pipe, only one of the load locks 103 may be vented at a time (e.g., the load locks 103 are alternately vented). Alternatively or additionally, the control system 135 determines the number of robot arms (e.g., total number of vacuum robot arms 131 and ATM robot arms 109) included in the electronic device manufacturing tool. Alternatively or additionally, the control system 135 determines the number of chambers (e.g., load locks, processing chambers, etc.) and the number of slots included in each such chamber. Each of the above mechanical factors may serve as limitations of the system during electronic device manufacturing, and therefore, may affect the electronic device manufacturing throughput.

In step 409, at least one process factor for an auxiliary chamber in the electronic device manufacturing tool is determined. For example, the speed at which one or more operations (e.g., processes) are performed in the auxiliary chamber and/or the duration of such operations is determined. For example, the heating time of a heating chamber for a particular customer specified process may be determined. The user may input the duration of the operations performed in the auxiliary chambers to the control system 135. Although, other process factors of the auxiliary chamber may be determined.

In step 411, at least one of a process time and process maintenance (e.g., clean) time for a processing chamber in the electronic device manufacturing tool is calculated based on the at least one mechanical factor and the at least one process factor for the auxiliary chamber such that the required electronic device manufacturing throughput is met (e.g., during electronic device manufacturing). More specifically, the control system 135 is operable to calculate the optimal processing chamber process time and/or the best processing chamber process maintenance time for the electronic device manufacturing tool to meet the required throughput. The control system 135 can perform this calculation without having to actually perform the processes.

In some embodiments, if the desired throughput is not attainable based upon the provided mechanical and/or process factors, the control system 135 may indicate various options that may be changed including mechanical factors and process factors. For example, if a tool designer determines that given an initial set of manufacturing factors, a throughput of sixty-five substrates processed per hour is desired, the present invention may respond that, for example, either a CVD process must be shortened from six minutes to three minutes, or an ATM transfer time must be reduced from eleven seconds to two seconds, or a pump time must be reduced from thirty seconds to five seconds, or some combination of the above three choices. The designer may then determine which proposed changes are possible or feasible and alter the tool design (mechanical factors) to achieve the required throughput.

In step 413, the method 401 ends. Through use of the method 401 of FIG. 4, a user may employ the control system 135 to design an electronic device manufacturing tool 101 with an enhanced electronic device manufacturing throughput.

The method 401 of FIG. 4, employs at least one mechanical factor and at least one process factor of a auxiliary chamber to calculate the process time and/or process maintenance time of a processing chamber in the electronic device manufacturing tool such that a required electronic device manufacturing throughput is met. Therefore, some process factors associated with the tool may be calculated from mechanical factors (e.g., limitations).

Similarly, a user may employ the present methods and apparatus for enhancing throughput within a tool by calculating at least one mechanical factor of the tool based on at least one process factor of the tool. More specifically, as described above, a required electronic device manufacturing throughput for the electronic device manufacturing tool is determined. Further, at least one of a process time and process maintenance time for a processing chamber in the electronic device manufacturing tool is determined. For example, a user may specify a required process time and/or process maintenance time to the control system 135. At least one mechanical factor of the electronic device manufacturing tool is calculated based on the process time and/or the process maintenance time of the processing chamber in the tool such that the required throughput is met. More specifically, the control system 135 is adapted to calculate the optimal mechanical factors, such as a total number of robot arms, chambers, chamber slots, etc., to be included in the electronic device manufacturing tool based on the at least one of the process time and process maintenance time of the processing chamber in the electronic device manufacturing tool such that the required electronic device manufacturing throughput is met. The control system 135 can perform this calculation without having to actually execute the processes. As indicated above, the system may suggest alternative values of manufacturing factors that may be altered to meet the desired throughput requirements.

The foregoing description discloses only exemplary embodiments of the invention. Modifications of the above disclosed apparatus and methods which fall within the scope of the invention will be readily apparent to those of ordinary skill in the art. For instance, in one or more embodiments, the present methods and apparatus assume all chambers of the electronic device manufacturing tool 101 are in good condition and system operations finish on time. Additionally, in some embodiments, it may be assumed the difference between chambers of the electronic device manufacturing tool 101 may be ignored or the longest operation time of a chamber may be employed to calculate the schedule. Further, a new electronic device manufacturing schedule may be calculated because of a chamber fault, delay in a system operation or a switch to manual mode of operation (e.g., from an auto-production mode), which requires an operator to assist in the electronic device manufacturing process. Although exemplary electronic device manufacturing tool configurations and manufacturing factors are described above, different system configurations and/or different and/or additional factors may be employed.

Accordingly, while the present invention has been disclosed in connection with exemplary embodiments thereof, it should be understood that other embodiments may fall within the spirit and scope of the invention, as defined by the following claims.

The invention claimed is:

1. A method of enhancing electronic device manufacturing throughput within an electronic device manufacturing tool, comprising:
for the electronic device manufacturing tool, creating an electronic device manufacturing schedule based on process factors and mechanical factors associated with the electronic device manufacturing tool; and
employing the electronic device manufacturing schedule during electronic device manufacturing within the electronic device manufacturing tool;
wherein the electronic device manufacturing schedule is further based on a process time and process maintenance time for a processing chamber in the electronic device manufacturing tool associated with the process factors and mechanical factors of the electronic device manufacturing tool such that a required electronic device manufacturing throughput is met.

2. The method of claim 1 further comprising:
detecting a change in at least one of the process factors and mechanical factors associated with the electronic device manufacturing tool; and
creating a modified electronic device manufacturing schedule based on any detected change in process factors and mechanical factors associated with the electronic device manufacturing tool.

3. The method of claim 2 further comprising employing the modified electronic device manufacturing schedule during electronic device manufacturing.

4. The method of claim 1 wherein the mechanical factors are determined by a manufacturer of the electronic device manufacturing tool.

5. The method of claim 1 wherein the mechanical factors comprise one or more of whether a chamber is online, a time required for pumping a load lock, a time required for venting a load lock, a vacuum robot transfer time, an atmospheric robot transfer time, a number of chambers present in the electronic device manufacturing tool, a number of slots included in each chamber present in the electronic device manufacturing tool, and a number of robot arms included in the electronic device manufacturing tool.

6. The method of claim 1 wherein the process factors are determined by a user of the electronic device manufacturing tool.

7. The method of claim 1 wherein the process factors comprise one or more of a process time, a pre-heat time, a periodic maintenance (pm) cycle, a pm cleaning recipe time, which chamber a substrate is to be transferred to, what process a chamber is to perform, a recipe to be employed by a chamber, and a number of times a process is to be performed by a chamber.

8. A method of enhancing electronic device manufacturing throughput within an electronic device manufacturing tool, comprising:
determining a required electronic device manufacturing throughput for the electronic device manufacturing tool;
determining at least one mechanical factor of the electronic device manufacturing tool;
determining at least one process factor for an auxiliary chamber in the electronic device manufacturing tool; and
calculating at least one of a process time and process maintenance time for a processing chamber in the electronic device manufacturing tool based on the at least one mechanical factor of the electronic device manufacturing tool and the at least one process factor for the auxiliary chamber such that the required electronic device manufacturing throughput is met.

9. The method of claim 8 wherein calculating is performed before electronic device manufacturing.

10. The method of claim 8 wherein any mechanical factors are determined by a manufacturer of the electronic device manufacturing tool.

11. The method of claim 8 wherein any mechanical factors comprise one or more of whether a chamber is online, a time required for pumping a load lock, a time required for venting a load lock, a vacuum robot transfer time, an atmospheric robot transfer time, a number of chambers present in the electronic device manufacturing tool, a number of slots included in each chamber present in the electronic device manufacturing tool, and a number of robot arms included in the electronic device manufacturing tool.

12. The method of claim 8 wherein any process factors are determined by a user of the electronic device manufacturing tool.

13. The method of claim 8 wherein any process factors comprise one or more of a process time, a pre-heat time, a periodic maintenance (pm) cycle, a pm cleaning recipe time, which chamber a substrate is to be transferred to, what process a chamber is to perform, a recipe to be employed by a chamber, and a number of times a process is to be performed by a chamber.

14. A method of enhancing electronic device manufacturing throughput within an electronic device manufacturing tool, comprising:
  determining a required electronic device manufacturing throughput for the electronic device manufacturing tool;
  determining at least one of a process time and process maintenance time for a processing chamber in the electronic device manufacturing tool; and
  calculating at least one mechanical factor of the electronic device manufacturing tool based on the at least one of the process time and process maintenance time of the processing chamber such that the required electronic device manufacturing throughput is met.

15. The method of claim 14 wherein calculating is performed before electronic device manufacturing.

16. The method of claim 14 wherein the at least one mechanical factor comprises one or more of whether a chamber is online, a time required for pumping a load lock, a time required for venting a load lock, a vacuum robot transfer time, an atmospheric robot transfer time, a number of chambers present in the electronic device manufacturing tool, a number of slots included in each chamber present in the electronic device manufacturing tool, and a number of robot arms included in the electronic device manufacturing tool.

17. An apparatus for enhancing electronic device manufacturing throughput within an electronic device manufacturing tool, comprising:
  a control system adapted to:
    for the electronic device manufacturing tool, create an electronic device manufacturing schedule based on process factors and mechanical factors associated with the electronic device manufacturing tool; and
    employ the electronic device manufacturing schedule during electronic device manufacturing within the electronic device manufacturing tool;
  wherein the electronic device manufacturing schedule is further based on a process time and process maintenance time for a processing chamber in the electronic device manufacturing tool associated with the process factors and mechanical factors of the electronic device manufacturing tool such that a required electronic device manufacturing throughput is met.

18. The apparatus of claim 17 wherein the control system is further adapted to:
  detect a change in at least one of the process factors and mechanical factors associated with the electronic device manufacturing tool; and
  create a modified electronic device manufacturing schedule based on any detected change in process factors and mechanical factors associated with the electronic device manufacturing tool.

19. The apparatus of claim 17 wherein the control system is further adapted to employ the modified electronic device manufacturing schedule during electronic device manufacturing.

20. The apparatus of claim 17 wherein the mechanical factors are determined by a manufacturer of the electronic device manufacturing tool.

21. The apparatus of claim 17 wherein the process factors are determined by a user of the electronic device manufacturing tool.

22. An apparatus for enhancing electronic device manufacturing throughput within an electronic device manufacturing tool, comprising:
  a control system adapted to:
    determine a required electronic device manufacturing throughput for the electronic device manufacturing tool;
    determine at least one mechanical factor of the electronic device manufacturing tool;
    determine at least one process factor for an auxiliary chamber in the electronic device manufacturing tool; and
    calculate at least one of a process time and process maintenance time for a processing chamber in the electronic device manufacturing tool based on the at least one mechanical factor of the electronic device manufacturing tool and the at least one process factor for the auxiliary chamber such that the required electronic device manufacturing throughput is met.

23. The apparatus of claim 22 wherein the control system is adapted to calculate the at least one of the process time and process maintenance time, before electronic device manufacturing.

24. An apparatus for enhancing electronic device manufacturing throughput within an electronic device manufacturing tool, comprising:
  a control system adapted to:
    determine a required electronic device manufacturing throughput for the electronic device manufacturing tool;
    determine at least one of a process time and process maintenance time for a processing chamber in the electronic device manufacturing tool; and
    calculate at least one mechanical factor of the electronic device manufacturing tool based on the at least one of the process time and process maintenance time of the processing chamber such that the required electronic device manufacturing throughput is met.

25. The apparatus of claim 24 wherein the control system is adapted to calculate the at least one mechanical factor before electronic device manufacturing.

* * * * *